UNITED STATES PATENT OFFICE.

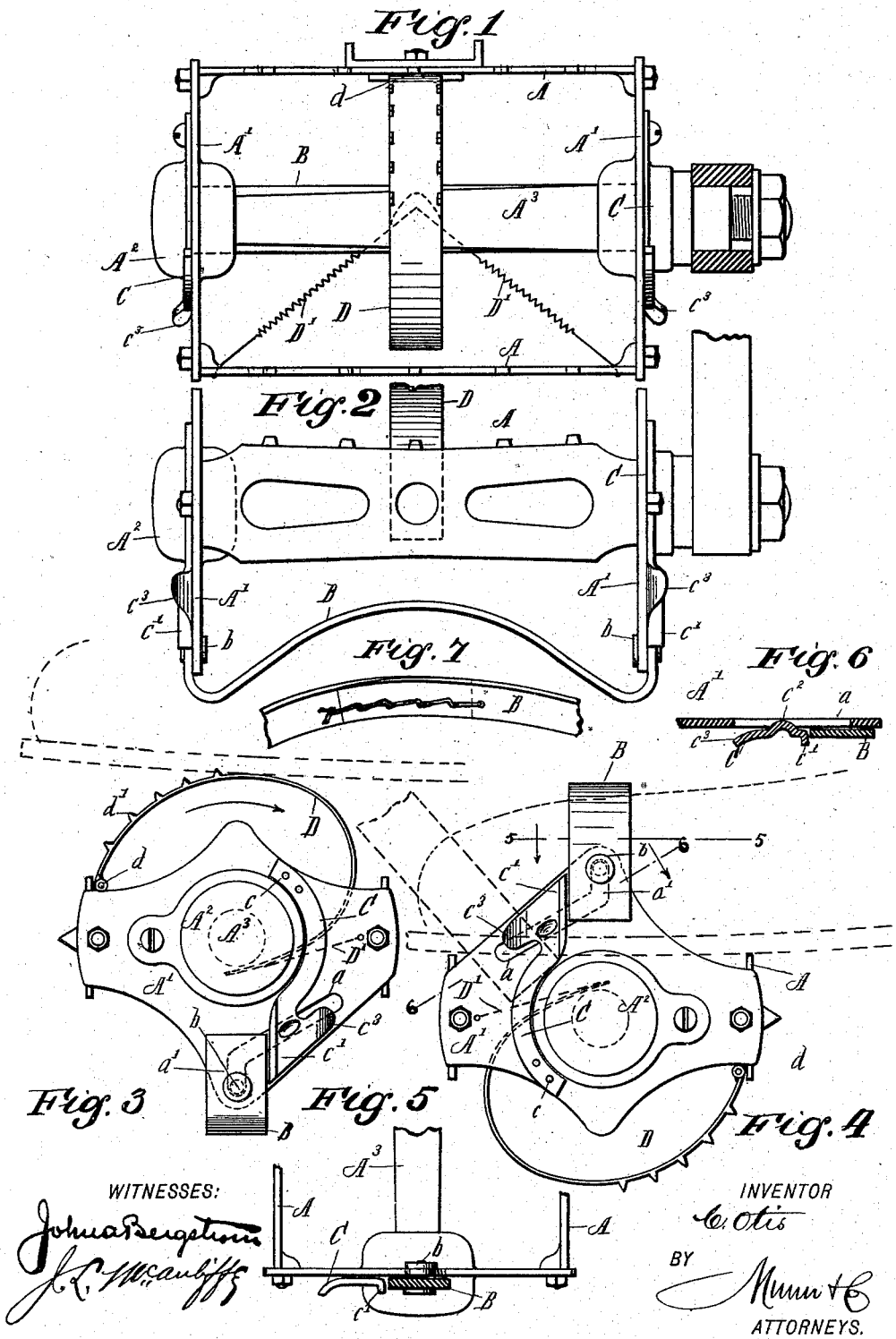
(No Model.)
C. OTIS.
PEDAL FOR BICYCLES.
No. 565,788. Patented Aug. 11, 1896.
WITNESSES:
INVENTOR
C. Otis
BY
ATTORNEYS.

CHARLES OTIS, OF NEW YORK, N. Y.

PEDAL FOR BICYCLES.

SPECIFICATION forming part of Letters Patent No. 565,788, dated August 11, 1896.

Application filed July 21, 1894. Serial No. 518,186. (No model.)

*To all whom it may concern:*

Be it known that I, CHARLES OTIS, of New York city, in the county and State of New York, have invented certain new and useful Improvements in Pedals for Bicycles and the Like, of which the following is a full, clear, and exact description.

The object of the invention is to provide a pedal having a strap for the insertion of the foot of the rider for the purpose of holding the pedal at all times, also for enabling the rider to apply a lifting force on the pedals when desired for speeding or heavy riding.

The invention further has for its object to provide for the ready engagement of the foot with the pedal at all times by constructing the parts so that the strap will normally lie at the lower side of the pedal and will not therefore be stepped upon by the rider, provision being made for reversing the pedal to bring the strap uppermost and in position to permit the rider to enter his foot beneath the same.

The invention consists in the novel construction hereinafter described, and defined in the claims.

Reference is to be had to the accompanying drawings, forming a part of this specification, in which similar letters of reference indicate corresponding parts in all the views.

Figure 1 is a plan view of a pedal embodying my invention. Fig. 2 is a broken side elevation. Fig. 3 is an end elevation of the pedal. Fig. 4 is an end elevation of the pedal in the reverse position to that shown in Fig. 3. Fig. 5 is a broken sectional plan view, the section being taken on line 5 5 in Fig. 4. Fig. 6 is a detail sectional view, the section being taken on a line indicated by line 6 6 in Fig. 4; and Fig. 7 is a broken detail view showing an adjustable strap.

The pedal may be in general of any of the approved forms in general use. That shown in the present instance is in the main similar to the "rat-trap" or toothed form; but in the present instance the teeth are omitted from one edge of the cross-bars A, which, with the end plates A', compose the frame of the pedal.

The leather strap B, which is provided for engagement with the foot of the rider, ranges in the direction of the axis and is secured by its ends to the end plates of the pedal in the following manner; through the ends of the straps rivets $b$ are passed, and they also pass through slots $a$, formed in the end plates A', such slots ranging diagonally through the plates at one side of the axis of the pedal and terminating in branches $a'$, which are about radially disposed with respect to the axis of the pedal, and in such branches the studs or rivets $b$ of the straps are normally sustained. The means for maintaining the straps in this position consists of a spring-plate C of novel form arranged in connection with each end plate A'. Each plate C is secured at one end to an end plate A', as at $c$, and follows the circular lines of the cap $A^2$ of the bearing, and the free end of such spring-plate is so formed as to provide a turned-up edge $c'$, which normally abuts a side edge of the strap B and prevents movement of the latter, and such free end of the spring-plate, further, is indented, as at $c^2$, to enter the inclined part of the slot $a$.

The pedal and its attachments are so balanced that the strap B will normally lie at the under side of the pedal, so that in mounting the wheel the rider may place his foot firmly on the opposite side of the pedal and without regard to the strap. In order that the strap may be brought uppermost after the rider has mounted, the opposite side of the pedal is provided with a plate-spring D, which spring ranges in general transversely to the axis of the pedal and is secured to a cross-bar of the pedal, as at $d$, curves upwardly and rearwardly above the tread of the pedal and then curves downwardly and forwardly beneath the crank-spindle $A^3$, as in Fig. 3, the free end of the spring preferably being secured to auxiliary springs D' of the spiral variety, which springs D' diverge from their point of connection with spring D to opposite ends of the rear cross-bar A' of the pedal.

With this construction when the rider mounts the wheel his foot will be placed on the springs D, as indicated in Fig. 3, and the springs will yield under the pressure until the foot comes down firmly against the cross-bars forming the tread of the pedal. The spring will thus be forced outward on the under side of the pedal and will press the strap downward into proper shape in the event the strap is buckled, as shown in Fig. 2. When, however, the wheel has been started and it is desired to engage the strap, the pressure of the foot on the spring D is slightly relaxed by partly raising the foot, and the said spring in its reaction will press against the foot of the rider and enable him to more readily turn the pedal on its axis from the position shown in Fig. 3, in the direction of the arrow, sufficiently near to the position shown in Fig. 4 to enable the rider to cause the pedal to assume the position of Fig. 4, and as the strap is brought upward the rider may enter his foot therebeneath, as will readily be understood. The spring D is ordinarily toothed on its side edges and by pressing upward provides a proper contact with the rider's foot and thus insures the turning of the pedal, by a rearward movement of the foot, to bring the strap uppermost.

The spring-plates C, it has been explained, hold the strap in proper position, (either at the top or bottom of the pedal;) but in the event the rider desires to throw the strap down to the front of the pedal, so as to be reached by the rider with his hand and drawn over the foot, the spring-plates C will yield sufficiently by a downward pressure of the strap to permit the latter to be moved so that its studs $b$ will travel in the inclined slots $a$ to the lower ends thereof, so that the strap will be in the position indicated in dotted lines in Fig. 4. The spring-plate C has a curved end $c^3$, which permits the strap to pass the plate readily in being returned to the position shown in full lines.

The strap may in practice be joined and laced at the center, as indicated in Fig. 7, in order to provide for adjustment.

Having thus described my invention, I claim as new and desire to secure by Letters Patent—

1. The combination, with a pedal, of a strap at one side thereof, ranging substantially in line with the axis of the pedal, and a spring at the opposite side normally projecting above the tread of the pedal, substantially as described.

2. The combination, with a pedal, of a strap at one side ranging substantially in line with the axis of the pedal, and a plate-spring secured at the opposite side of the pedal, at the front and curving upwardly and rearwardly and then downwardly, substantially as described.

3. The combination, with a pedal, having slots at the ends thereof, of a strap ranging substantially in line with the axis of the pedal and having studs engaging the slotted ends of the pedal, and spring-plates normally maintaining the studs at one end of the slots, substantially as described.

CHARLES OTIS.

Witnesses:
JOHN E. RIDNER,
ADOLPH SOUTHOF.